(12) United States Patent     (10) Patent No.:    US 7,647,133 B2
Gee et al.     (45) Date of Patent:    Jan. 12, 2010

(54) METHOD AND APPARATUS FOR OPTIMIZATION OF CUTTING LUMBER

(75) Inventors: Jeff Gee, Grand Prairie, TX (US); David L. McAdoo, Grand Prairie, TX (US)

(73) Assignee: Alpine Engineered Products, Inc., Grand Prairie, TX (US)

( * ) Notice: Subject to any disclaimer, the term of this patent is extended or adjusted under 35 U.S.C. 154(b) by 889 days.

(21) Appl. No.: 11/249,658

(22) Filed: Oct. 12, 2005

(65) Prior Publication Data

US 2007/0113929 A1    May 24, 2007

(51) Int. Cl.
*G06F 19/00*     (2006.01)
*B26D 7/06*     (2006.01)
*B26D 5/00*     (2006.01)
*B27M 3/24*     (2006.01)

(52) U.S. Cl. ............................. 700/171; 83/27; 83/75.5; 144/9

(58) Field of Classification Search ................... 700/28, 700/171; 83/13, 27, 49, 56, 75.5, 421; 144/39, 144/41, 73
See application file for complete search history.

(56) References Cited

U.S. PATENT DOCUMENTS 3,289,662 A    12/1966    Garrison (Continued)

OTHER PUBLICATIONS

Han, G. C., et al.; Two-Stage Approach for Nesting in Two-Dimensional Cutting Problems Using Neural Network and Simulated Annealing; "Institution of Mechanical Engineers Proceedings, Journal of Engineering Manufacture, Mechanical Engineering Publications, Ltd." London, GB, vol. 210, No. B06, Jan. 1996; pp. 509-519 XP000646321; ISSN: 0954-4054.

(Continued)

*Primary Examiner*—Crystal J Barnes-Bullock
(74) *Attorney, Agent, or Firm*—Peter V. Schroeder; Booth Albanesi Schroeder LLC

(57) ABSTRACT

A computer-based method for maximizing the use of lumber in the production of truss members for a truss assembly using a linear feed saw apparatus. The method comprises storing a list of truss members to be cut by the linear feed saw apparatus, selecting from the list a first truss member for cutting, the first member having a trailing end. A second truss member from the list is selected for cutting, the second member having a first end that will nest with the trailing end of the first member. The second member is oriented such that its first end nests with the trailing end of the first member. The members are then cut using the linear feed saw. The nesting members can abut across the entire member width, only across a portion of the member width or at a single point. The nested ends of the first and second members may be bevel cuts. The selecting of a second truss member may comprise comparing the angles of the cuts to be made on the trailing end of the first member to the angles of the cuts to be made on the ends of at least two of the members on the list. The selected member may have an angle to be cut which is supplementary to one of the angles of the trailing end of the first member or which is close fitting with an angle on the trailing end of the first member. The selected member is oriented such that the supplementary or close fitting angle of the selected member is adjacent the corresponding supplementary or close fitting angle of the first member. Orienting the selected member may further comprise rotating the member around its longitudinal axis, its lateral axis or both.

10 Claims, 5 Drawing Sheets

U.S. PATENT DOCUMENTS

| | | | |
|---|---|---|---|
| 3,848,646 A | | 11/1974 | Miles |
| 3,880,036 A | * | 4/1975 | Yokoyama ................... 83/421 |
| 3,910,142 A | | 10/1975 | Jureit et al. |
| 4,017,976 A | | 4/1977 | Barr |
| 4,195,346 A | | 3/1980 | Schröder |
| 4,239,069 A | * | 12/1980 | Zimmerman ................. 144/39 |
| 4,277,998 A | | 7/1981 | Mayo |
| 4,316,400 A | | 2/1982 | Mayo |
| 4,461,196 A | | 7/1984 | Schramm, II |
| 4,545,274 A | | 10/1985 | Germond |
| 4,549,454 A | * | 10/1985 | Yamashita .................... 83/27 |
| 4,574,670 A | | 3/1986 | Johnson |
| 4,576,076 A | | 3/1986 | Pyle |
| 4,641,557 A | | 2/1987 | Steiner |
| 4,676,129 A | | 6/1987 | Blanco |
| 4,794,963 A | | 1/1989 | Oppenneers |
| 4,840,207 A | * | 6/1989 | Lines .......................... 144/41 |
| 4,943,038 A | | 7/1990 | Harnden |
| 5,064,130 A | * | 11/1991 | Blaimschein et al. .... 242/419.4 |
| 5,176,060 A | | 1/1993 | Thornton |
| 5,297,463 A | | 3/1994 | O'banion et al. |
| 5,440,977 A | | 8/1995 | Poutanen |
| 5,444,635 A | | 8/1995 | Blaine et al. |
| 5,662,019 A | | 9/1997 | Denman |
| 5,813,806 A | | 9/1998 | Muller |
| 5,931,073 A | | 8/1999 | Hoyer-Ellefsen |
| 5,943,239 A | | 8/1999 | Shamblin et al. |
| 6,000,305 A | | 12/1999 | Link |
| 6,021,826 A | * | 2/2000 | Daniell ........................ 144/73 |
| 6,116,126 A | | 9/2000 | Van Den Bulcke et al. |
| 6,196,283 B1 | | 3/2001 | Hundegger |
| 6,212,983 B1 | | 4/2001 | Pyle |
| 6,260,263 B1 | | 7/2001 | Haase |
| 6,263,773 B1 | | 7/2001 | McAdoo et al. |
| 6,272,961 B1 | | 8/2001 | Lee |
| 6,539,830 B1 | | 4/2003 | Koskovich |
| 6,615,100 B1 | | 9/2003 | Urmson |
| 6,640,855 B2 | | 11/2003 | Giles |
| 6,690,990 B1 | * | 2/2004 | Caron et al. ................. 700/171 |
| 6,705,190 B2 | * | 3/2004 | Newnes et al. ............... 83/75.5 |
| 6,886,251 B1 | * | 5/2005 | Andrews ................. 29/897.35 |
| 6,899,005 B1 | | 5/2005 | O'banion et al. |
| 6,976,377 B2 | * | 12/2005 | Klingen et al. ................. 72/96 |
| 2002/0092389 A1 | * | 7/2002 | Feldman et al. ................ 83/49 |
| 2002/0194967 A1 | | 12/2002 | Prust et al. |
| 2004/0069106 A1 | | 4/2004 | McAdoo |
| 2004/0199283 A1 | | 10/2004 | Dick et al. |
| 2005/0076759 A1 | | 4/2005 | Westfall et al. |
| 2005/0262977 A1 | * | 12/2005 | Wilkerson et al. .............. 83/13 |
| 2008/0184856 A1 | * | 8/2008 | Koskovich ..................... 83/56 |

OTHER PUBLICATIONS

"The Awesome Power of Optimizing with The Alpine Linear Saw"; David McAdoo; "Good Connection" Spring 2005; May 16, 2005; retrieved from the Internet: URL:http://www.alpeng.com/upload/19373/ALSstories_SHAN-WEB.pdf; pp. 16-19.
RAM Easy Rider, Alpine Engineered Products, Inc.
AutoMill RS, Alpine Engineered Products, Inc.
"The TCT WebSaw is the best thing to hit the truss industry in my 27 years." Klaisler Mfg. Corp.
The Hundegger Speed-Cut Machine, www.hundeggerusa.com.
Hundegger K2 Milling Machine, www.hundeggerusa.com.

* cited by examiner

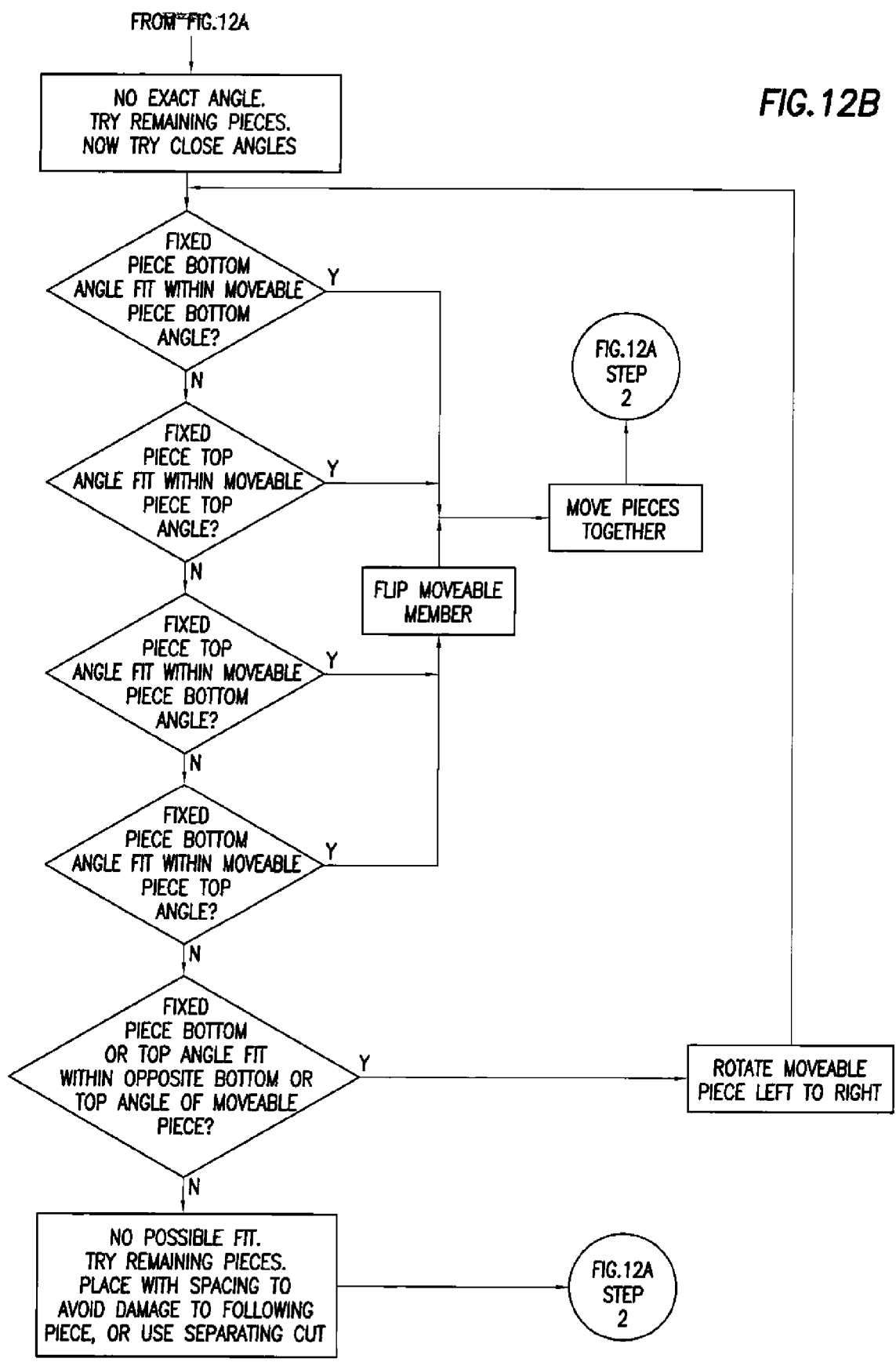

METHOD AND APPARATUS FOR OPTIMIZATION OF CUTTING LUMBER

CROSS-REFERENCE TO RELATED APPLICATIONS

None

STATEMENT REGARDING FEDERALLY SPONSORED RESEARCH OR DEVELOPMENT

None

REFERENCE TO MICROFICHE APPENDIX

Not applicable

TECHNICAL FIELD

The present invention relates generally to a system and method for optimization of the cutting of lumber, and more particularly to a computer-based system and method for selecting and orienting truss members for cutting in a linear feed saw.

BACKGROUND

With the rising cost of wood and lumber, it has become ever more important to reduce the lost costs associated with lumber waste produced in the truss manufacturing industry. Optimization of lumber use has been addressed in U.S. Pat. No. 5,444,635 to Blaine, which is incorporated herein for all purposes. However, further optimization is still needed. The instant invention specifically addresses optimization of lumber use in a linear feed saw. The linear feed saw will not be explained in detail, however, examples of such saws can be found in U.S. Pat. Application Publication Nos. US 2004/0069106 to McAdoo and US 2005/0076759 to Westfall, et al., both of which are incorporated herein for all purposes.

SUMMARY OF THE INVENTION

A computer-based method for maximizing the use of lumber in the production of truss members for a truss assembly using a linear feed saw apparatus. The method comprises storing a list of truss members to be cut by the linear feed saw apparatus, selecting from the list a first truss member for cutting, the first member having a trailing end. A second truss member from the list is selected for cutting, the second member having a first end that will nest with the trailing end of the first member. The second member is oriented such that its first end nests with the trailing end of the first member. The members are then cut using the linear feed saw. The nesting members can abut across the entire member width, only across a portion of the member width or at a single point. The nested ends of the first end second members may be bevel cuts. The selecting of a second truss member may comprise comparing the angles of the cuts to be made on the trailing end of the first members to the cuts to be made on the ends of at least two of the members on the list The selected member may have an angle to be cut which is supplementary one of the angles of the trailing end of the first member or which is close fitting with an angle on the trailing end of the first member. The selected member is oriented such that the supplementary or close fitting angle of the selected member is adjacent the corresponding supplementary or close fitting angle of the first member. Orienting the selected member may further comprise rotating the member around its longitudinal axis, its lateral axis or both.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
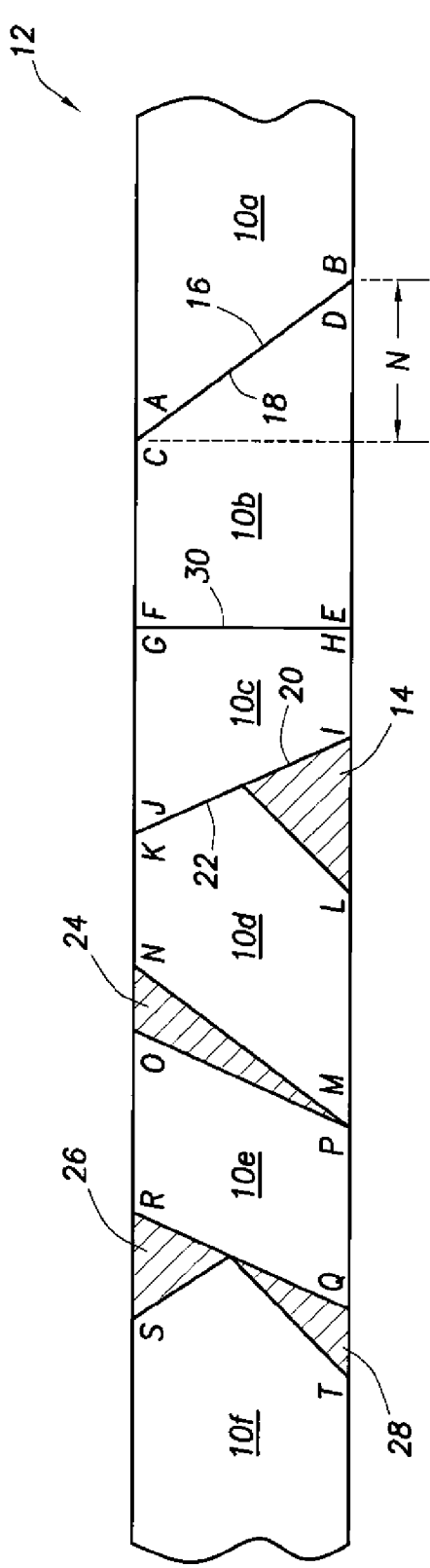
FIG. 1 is a top view of a plurality of truss members to be cut from a single piece of stock lumber, the members nested with one another in accordance with the invention.

With reference now to FIG. 1, there is shown a plurality of truss members 10 to be cut from a single piece of lumber 12. FIG. 1 is a top view of a piece of lumber, such as a two by four with lines indicating where cuts are to be made. The cut lines are shown as solid lines and the resulting waste lumber 14 is shown as cross-hatched. FIG. 1 shows the general concept of "nesting" the truss members to reduce waste. The truss members are laid out such that member 10a would be the first member cut as the lumber 12 is fed into the linear feed saw. That is, the right side of the lumber is fed first into the saw.

The trailing end 16 of the first member 10a is coincident with the leading end 18 of the second member 18. These two pieces are "nested" in that they linearly overlap—that is, the furthest extent of the trailing end 16 of member 10a extends past the leading end 18 of the member 10b as indicated by the dashed lines and distance N. In this type of nesting, the ends of the two nesting members abut one another across the entire width of the lumber. Nesting is not limited to this configuration, however. Nesting is defined as any linear overlap between adjacent truss members. All of the cuts shown in FIG. 1 are nesting cuts and all of the members nest with their adjacent members except for the cut 30. Members 10b and 10c do not nest with respect to one another, they do not linearly overlap, because cut 30 is at a 90 degree angle with respect to the lumber edge.

Another type of nesting is seen with members 10c and 10d. These members overlap linearly as well, although the leading end 22 of member 10c has two cuts and produces waste section 14. Members 10c and 10d abut across only a portion of the width of the lumber 12. Members 10d and 10e also nest, even though they only abut one another at a single point. Waste section 24 is produced when these members are cut. Similarly, members 10e and 10f nest with one another and abut at a single point and produce waste sections 26 and 28.

Each truss member 10 has four cut angles with respect to the edge of the lumber. The angles for member 10a are labeled A-B, the angles for member 10b are labeled C-F, etc. The truss members, as shown, are all "right side up." That is, the top faces of the members, which will face upward when the truss members are assembled on a truss assembly table, are face up in the Figure. (Truss assembly apparatus are known in the art and are described in detail, for example, in U.S. Pat. No. 4,943,038 to Harnden, which is incorporated herein by reference for all purposes.) Also note that the cuts in FIG. 1 are all vertical cuts. That is, they are perpendicular to the plane of the member faces. The angles at the upper edge of the lumber will be referred to herein as "top angles," such as angles A, C, F, G, J, etc. They will be referred to as "top angles" even where the truss member has been flipped, or rotated about its longitudinal axis, such that the top face of the member is facing downward. Similarly, the "bottom angles" are at the lower edge of the lumber, such as angles B, D, E, H, I, etc., and will be referred to as "bottom angles" even when the truss member has been flipped over.

Figure 2:
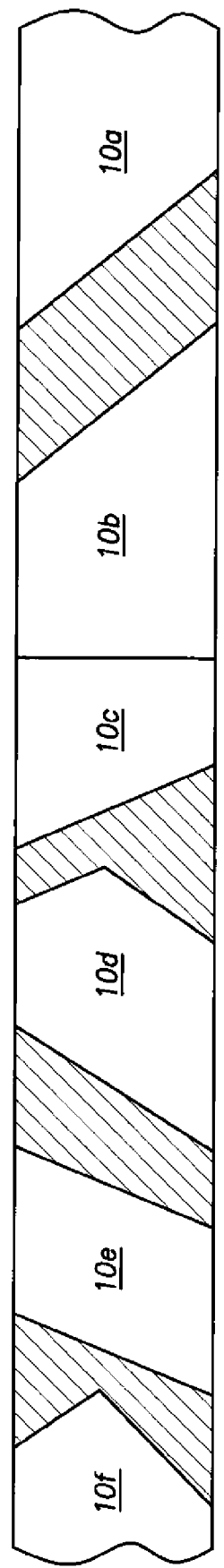
FIG. 2 is a top view of a plurality of truss members to be cut from a single piece of stock lumber, the truss members not nested with one another.

Top angles A and C are supplementary angles, hence, the ends 16 and 18 coincide. The same is true of bottom angles B and D. Similarly, top angles J and K are supplementary angles, resulting in the coincidence of at least a portion of member ends 20 and 22. Bottom angles M and P are not supplementary, however, their sum is less than 180 degrees and so the bottom angles of members 10d and 10e allow the bottom portion of members 10d and 10e to be nested. That is, since the angles sum to less than 180 degrees, there is "room" for nesting and the excess space becomes waste. The same is true of angles Q and T. They sum to less than 180 degrees and allow room for nesting of the bottom portions of members 10e and 10f. If the sum of adjacent angles is greater than 180 degrees, as in the case of top angles N and O, or R and S, then there is no "room" for nesting. Where nesting can occur, moving the members together reduces the waste which would be produced where the members left in the positions shown in FIG. 2. The invention provides a computer-based program tat recognizes where nesting can occur among a list of members and "moves together" members where possible. This is a powerful tool in optimizing lumber use when operating a linear feed saw.

Figure 3:
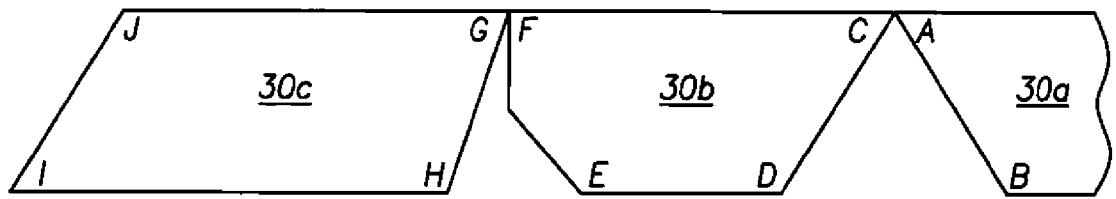
FIG. 3 is a top view of instances where the members do not allow room for nesting if left in their original orientation.
Figure 4:
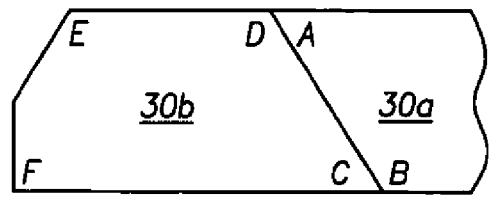
FIG. 4 is a top view of a truss member oriented by rotation about its longitudinal axis to provide for nesting.

FIG. 3 shows instances where the members do not allow room for nesting if left in their original orientation, that is, with the top face of the member up and the leading end on the right. However, nesting is possible if the members are "flipped" such that the member is rotated about it longitudinal axis and the top face is placed downward. For example, if top angle C of member 30b is supplementary to the bottom angle B of member 30a, then member 30b can be flipped,, or turned over, and the members 30a and 30b will nest, as seen in FIG. 4. This will hold true for all supplementary angles. So the members can be reoriented to move all supplementary angles together.

Figure 5:
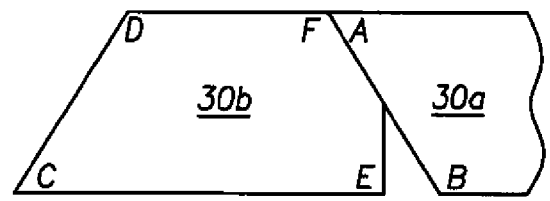
FIG. 5 is a top view of a truss member oriented by rotation about its lateral axis to provide for nesting.

In a similar manner, a member can be rotated 180 degrees about its lateral axis, or spun like a top, to match supplementary angles together. For example, if bottom angle F or member 30b is supplementary to top angle A or member 30a, then member 30b can be spun 180 degrees to the orientation in FIG. 5, which allows for nesting.

Figure 6:
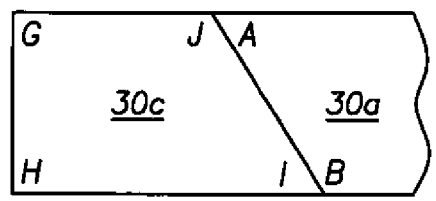
FIG. 6 is a top view of a truss member oriented by rotation about both its longitudinal and lateral axes to provide for nesting.

Finally, a member can be rotated about its longitudinal axis (flipped) and rotated about its lateral axis (spun) to place a supplementary angles adjacent. For example, if, in FIG. 3, bottom angle B of member 30a is supplementary to bottom angle I of member 30c, then member 30c can be flipped and spun to the position shown in FIG. 6 and the members nested together. All of these reorientations can be manipulated in the computer program to arrange the members to be cut in a more efficient manner.

Similarly, angles which sum to less than 180 degrees but are not adjacent with the members in their original orientation can be flipped, spun or both to achieve nesting. The nesting of these angles will still result in waste production (just as seen in waste portions 24 and 26) but will still reduce waste production.

Figure 7:
FIG. 7 is a top view of two truss members nested, one member having a butt cut end.
Figure 8:
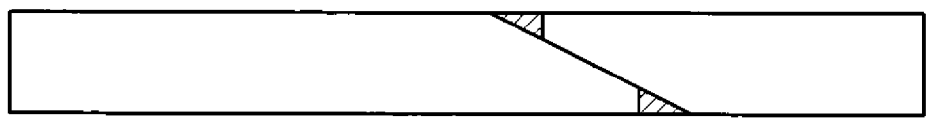
FIG. 8 is a top view of two truss members nested, both members having butt cut ends.

As another method of reducing waste and optimizing lumber use, "butt cuts" can be taken into account. In FIG. 7, for example, the butt cut 42 has an angle X of 90 degrees. Following the rules above, the sum of top angle X and top angle D would be greater than 180 degrees and nesting of members 40a and 40b would not be allowed. However, recognizing that butt cut 42 results in an end cut short enough to allow nesting results in further optimization. Butt cuts are typically short vertical cuts (90 degrees), although as used here, the term is intended to encompass more than simply 90 degree cuts. A similar result is seen in FIG. 8. The computer program will compute whether a butt cut member will nest with an adjacent member and move these members together.

Throughout the discussion above the analyzing of whether members will nest has been discussed in terms of supplementary angles and summing of angles to a benchmark of 180 degrees. This is simply one method of calculation and the examples are not intended to be limiting. For example, the program could compare a member angle to the "open space" angle adjacent another member and achieve the same result. It is not intended that a user can avoid infringement simply by changing which angles (angles of wood or angles of free space) are measured, whether the mathematical algorithm is rearranged using simple algebraic and geometric rules (for example, finding the difference between angles rather than the sums), or by using some other benchmark (for example, measuring all angles against the vertical) to reach the same conclusions.

If no nesting is possible, neither supplementary angles for exact matches nor angle summing to less than 180 degrees for imperfect matches exist, then the trailing member may need to be "moved back," or placed on the stock lumber with enough space to prevent damage to the trailing member when a separating cut is made between the two members.

Figure 9:
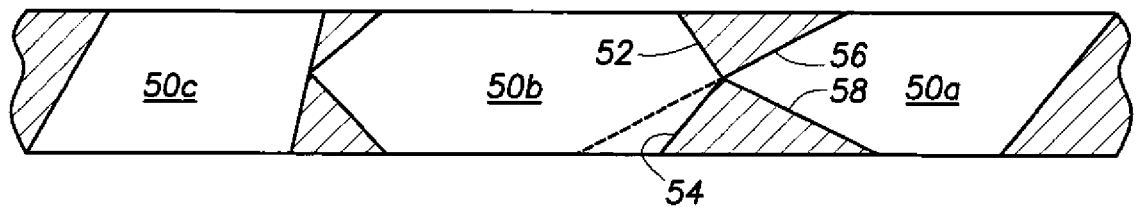
FIG. 9 is a top view of truss members arranged to optimize stock usage wherein a separation cut must be made to the trailing piece prior to cuts being made to the trailing end of the leading piece.
Figure 10:
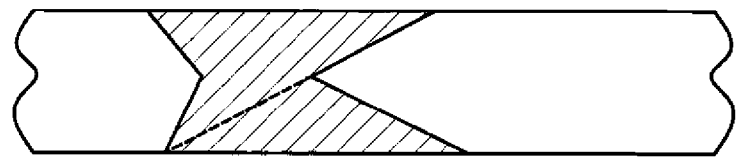
FIG. 10 is a top view of the spacing required if a separation cut is not made prior to cuts to the trailing end of the leading member.

FIG. 9 presents members 50a, 50b and 50c, which cannot be nested together. Additionally, no cut can be made along cut lines 56 or 58 of the trailing end of member 50a without damaging member 50b (see dashed lines). One way to overcome this problem is to place the trailing member 50b far enough back on the stock to prevent any damage, as seen in FIG. 10. However, this results in the waste of stock.

The present invention presents a solution. In FIG. 9, a separating cut would be made along end cut 52 or 54 of trailing member 50b prior to any cut being made on the trailing end of member 50a. A cut would be made along leading end 52 of member 50b, the remaining stock (including the lumber which will make up members 50b and 50c) would be moved backwards out of the way of the saw head and then cuts would be made along the trailing end of member 50a along lines 56 and 58. Member 50a would be moved downstream out of the way and the stock would be positioned for a cut along line 54. This method greatly reduces the waste of stock and further optimizes the use of lumber in a linear feed saw.

Figure 11:
FIG. 11 is an elevational view of nested bevel cuts.

The above discussion has centered around nesting "regular" cuts. That is, the cuts are made vertically, at a right angle to the top face of the member. The same optimization can be employed with bevel cuts as well. In FIG. 11, is a side elevational view of truss members 60a, 60b and 60c, each of which has a bevel cut, defined for purposes of this specification as a cut which is not vertical, that is, not perpendicular to the face of the truss member. The same rules apply for determining where nesting can be used to optimize lumber use in bevel buts and so will not be repeated at length here.

Figure 12A:
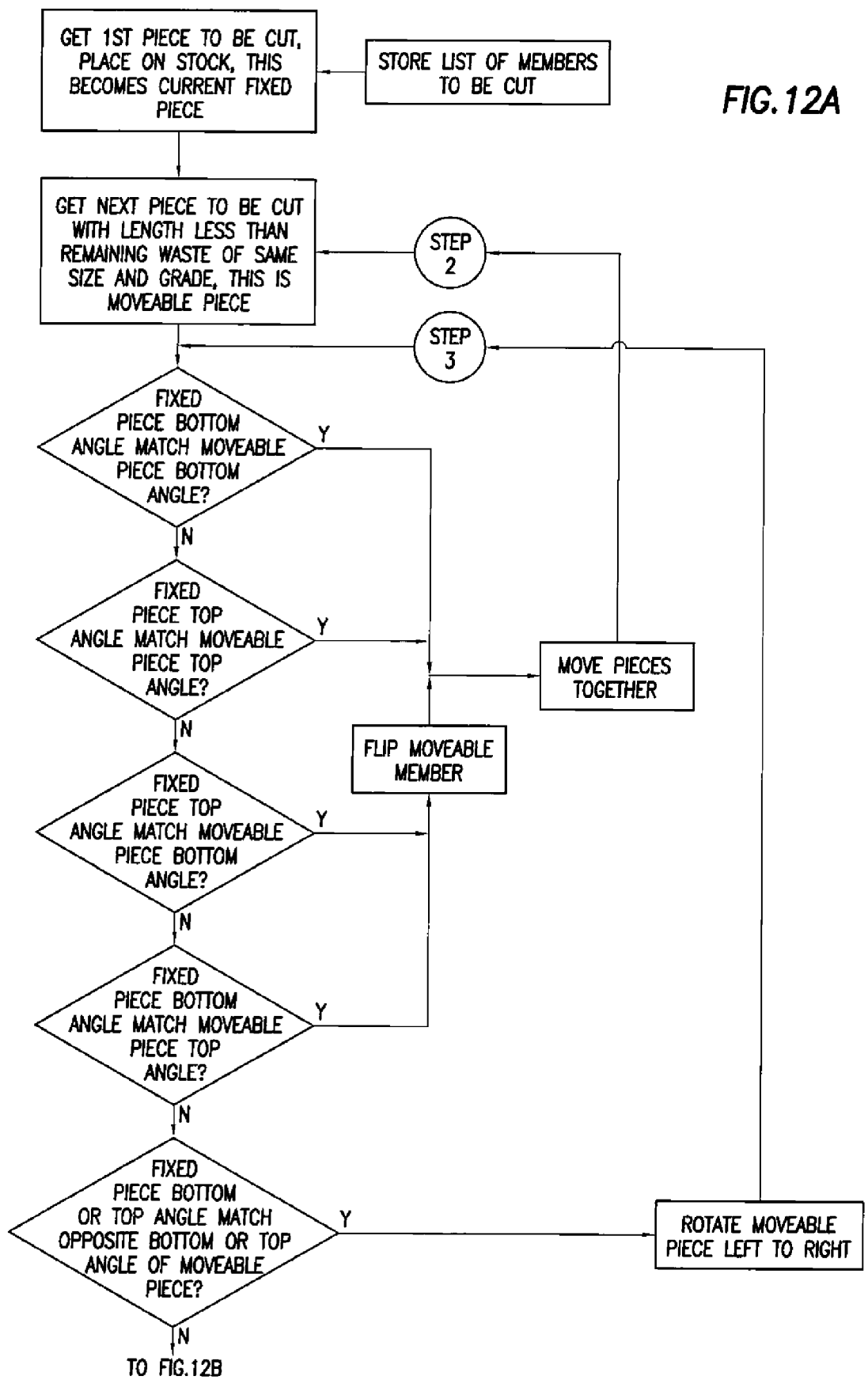
FIGS. 12A and B are flow charts of a computer program for optimization of lumber usage in a linear saw.

In practice, the above steps are taken in a software program stored on a digital media. The software or a computer-based system is used to store a list of truss members to be cut and a list of stock members available for creating the truss members. The list of truss members to be cut must include all of the dimensional data needed to describe the truss members, including the length and various angles of the members. FIGS. 12A and B show a flow chart of logic steps taken in arranging the truss members for cutting in a linear feed saw. Note that terms such as "arranging" and "orienting" presume a physical analog for the electronically stored truss member information.

At the top of the flow chart, the truss member information has been stored in a list. Similarly, the available stock length has been stored as well. The program may be capable of handling more than one size stock, for example, it can match truss members to 8, 10 and 12 foot stock, and/or more than one grade of lumber, such as placing all truss members of one grade onto stock of the same grade.

The program selects a first piece to be cut which may be referred to as the fixed piece. Typically the fixed piece selected is the longest remaining piece to be created, however, other members may be selected instead The remaining length of the unused stock is calculated and a second member of shorter length (such that it will fit onto the remaining stock) is selected and may be referred to as the movable piece. For the selected movable piece, the member angles are compared to the angles of the trailing end of the first member as indicated. Where a supplementary angle is found, a "match," the members are moved together or nested. If a supplementary angle is found at a top angle for an adjacent bottom angle (or vice versa), the movable piece is flipped, or rotated along its longitudinal axis, as discussed above and seen at FIG. 4. Where the only supplementary angle is found at the opposite end of the movable piece, the movable piece is rotated around its lateral axis, or spun, as discussed above in relation to FIG. 5. If still necessary, the movable piece is then flipped (having now been flipped and spun) as described above in relation to FIG. 6.

If no supplementary angles are found on the selected second piece, the program may try one or more of the remaining tress members to attempt to find a supplementary angle "match." Alternately or afterwards, the program will go through the same logic searching for "close fits" trying to pair adjacent angles that sum to less than 180 degrees as discussed above. Preferably, the program will attempt to fit the "closest" fits first—that is, go through the possible nesting pieces and insert the piece which sums with the adjacent angle to closest to 180 degrees. Stated another way, the program may run through the list of remaining pieces and find the one that will nest with the least amount of waste between the adjacent angles. This is not mandatory.

Preferably, when the exact matches (supplementary angles) and close fits (nesting of angles summing to less than 180 degrees) are exhausted, a truss member which cannot be nested may be placed on the stock to be cut. In this case, the truss member must either be placed with enough space to avoid damage to the following member (if any), as described in relation to FIG. 10 above, or the program will indicate that a separating cut must be first made on the trailing member prior to cutting the end cuts on the leading member, as described above in relation to FIG. 9.

Once a piece of stock is "full," that is, there is not enough stock to handle another truss member, the remaining stock (if any) is waste and the routine is run again for the next piece of stock.

It is not intended that these logical steps must be followed in exactly the order presented here, or even that all of the steps be followed. For example, the routine need not necessarily compare every remaining truss member in search of a supplementary angle or a closer fit, Similarly, the order of flipping and rotating the members can be done in another order. Other deviations from the logic tree will be readily apparent to those of skill in the art. Details like these maybe sacrificed without departing from the spirit of the invention.

Figure 13:
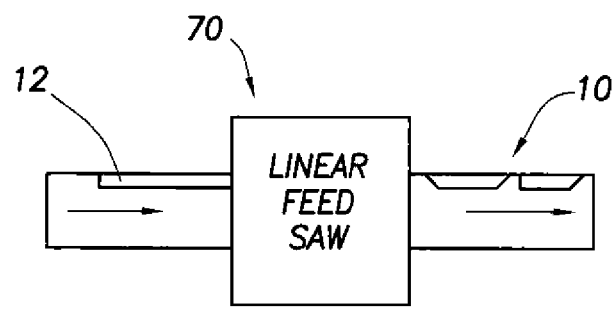
FIG. 13 is a block diagram of a liner feed saw apparatus.

Finally, the program having arranged and oriented the plurality of truss members to optimize the use of lumber in the linear feed saw, the program results are used to feed stock into a linear feed saw apparatus 70 which cuts the truss members 10 from the stock 12, as seen in block diagram FIG. 13.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A computer-based method for maximizing the use of lumber in the production of a plurality of truss members for a truss assembly using a linear feed saw apparatus, the method comprising the steps of:
   electronically storing a list of dimensional data describing a plurality of electronically stored truss members for which corresponding physical truss members are to be cut by a linear feed saw apparatus;
   selecting from the list a first electronically stored truss member to be cut, the first member having a leading end and a trailing end, the leading end to be fed into the linear feed saw first;
   selecting from the list a second electronically stored truss member to be cut, the second member having a first end able to be nested with the trailing end of the first member; the second truss member having an angle to be cut on its first end which is supplementary to one of the angles of the trailing end of the first member;
   electronically orienting the electronically stored second truss member such that its first end nests with the trailing end of the first member such that the first and second truss members linearly overlap one another, and wherein the angles to be cut on the trailing end of the first member and the first end of the second member are other than ninety degrees with respect to the edges of the members, and electronically orienting the first end of the second member such that it abuts the trailing end of the first member along only a portion of the first member width; and
   cutting physical truss members from a piece of lumber using the linear feed saw, the physical truss members corresponding to the selected, electronically stored truss members.

2. A method as in claim 1 wherein the first end of the electronically stored second member abuts the trailing end of the electronically stored first member only at a single point.

3. A method as in claim 1 wherein the nested ends of the first and second members are bevel cuts, that is, at other than a ninety degree angle to the face of the member.

4. A method as in claim 1 wherein the step of selecting a second truss member further comprises comparing the angles of the cuts to be made on the trailing end of the first member to the angles of the cuts to be made on the ends of at least two of the members on the list.

5. A method as in claim 1 wherein the step of orienting the second electronically stored member further comprises electronically rotating the member around its longitudinal axis.

6. A method as in claim 1 wherein the step of orienting the second electronically stored member further comprises electronically rotating the selected member about its latitudinal axis.

7. A method as in claim 6 wherein the step of orienting further comprises rotating the second electronically stored member around its longitudinal axis.

8. A computer-based method for maximizing the use of lumber in the production of a plurality of truss members for a truss assembly using a linear feed saw apparatus, the method comprising the steps of:
   electronically storing a list of dimensional data describing a plurality of electronically stored truss members for which corresponding physical truss members are to be cut by a linear feed saw apparatus;
   selecting from the list a first electronically stored truss member to be cut, the first member having a leading end and a trailing end, the leading end to be fed into the linear feed saw first;
   selecting from the list a second electronically stored truss member to be cut, the second member having a first end able to be nested with the trailing end of the first member such that the first and second truss members linearly overlap one another, and wherein the angles to be cut on the trailing end of the first member and the first end of the second member are other than ninety degrees with respect to the edges of the members; the second truss member having an angle to be cut on its first end which sums with a corresponding angle of the trailing end of the first member to less than 180 degrees;
   electronically orienting the electronically stored second truss member such that its first end nests with the trailing end of the first member; and
   cutting physical truss members from a piece of lumber using the linear feed saw, the physical truss members corresponding to the selected, electronically stored truss members.

9. A method as in claim 8 further comprising electronically orienting the selected second member such that the angle to be cut on the first end of the selected second member is adjacent the corresponding angle of the trailing end of the first member.

10. A method as in claim 9 wherein the step of orienting the electronically stored second member further comprises rotating the member around its longitudinal axis.

* * * * *

UNITED STATES PATENT AND TRADEMARK OFFICE
CERTIFICATE OF CORRECTION

PATENT NO.       : 7,647,133 B2  Page 1 of 1
APPLICATION NO.  : 11/249658
DATED            : January 12, 2010
INVENTOR(S)      : Gee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Sixteenth Day of November, 2010

David J. Kappos
*Director of the United States Patent and Trademark Office*